United States Patent
Segev et al.

(10) Patent No.: US 6,848,021 B2
(45) Date of Patent: Jan. 25, 2005

(54) EFFICIENT DATA BACKUP USING A SINGLE SIDE FILE

(75) Inventors: Danit Segev, Haifa (IL); Yoram Novick, Haifa (IL); Yigal Eisinger, D.N. Hamovil (IL); Gabriel Walder, Kiryat Haim (IL); Olympia Gluck, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 09/918,713

(22) Filed: Aug. 1, 2001

(65) Prior Publication Data

US 2003/0028723 A1 Feb. 6, 2003

(51) Int. Cl.[7] .............................................. G06F 12/00
(52) U.S. Cl. ........................ 711/113; 711/162; 711/165; 707/204; 709/217
(58) Field of Search ................................ 711/113, 161, 711/162, 163, 165; 707/204; 709/217

(56) References Cited

U.S. PATENT DOCUMENTS

| | | | |
|---|---|---|---|
| 4,507,751 A | 3/1985 | Gawlick et al. ............ 707/202 |
| 5,428,802 A | 6/1995 | Anglin et al. .................. 710/9 |
| 5,454,099 A | 9/1995 | Myers et al. ................... 714/6 |
| 5,717,884 A | * 2/1998 | Gzym et al. ................. 711/206 |
| 6,145,066 A | * 11/2000 | Atkin .......................... 711/165 |
| 6,279,084 B1 | * 8/2001 | VanDoren et al. .......... 711/141 |
| 6,463,501 B1 | * 10/2002 | Kern et al. ................. 711/100 |
| 6,487,561 B1 | * 11/2002 | Ofek et al. ................. 707/204 |

OTHER PUBLICATIONS

Kuzler et al., "IBM Enterprise Storage Server", IBM International Technical Support Organization, San Jose, California, 1999.

* cited by examiner

*Primary Examiner*—Pierre M. Vital
(74) *Attorney, Agent, or Firm*—Browdy and Neimark, P.L.L.C.

(57) ABSTRACT

A method for data backup includes creating a sidefile in a cache memory of a data storage system. Entries are added to the sidefile specifying copy operations to be respectively performed by copy services in the system, including at least first and second copy services of different, first and second types. The copy operations specified by the operations are then executed using the first and second copy services.

18 Claims, 4 Drawing Sheets

EFFICIENT DATA BACKUP USING A SINGLE SIDE FILE

FIELD OF THE INVENTION

The present invention relates generally to data storage systems, and specifically to efficient methods for backup copying of data in a storage system.

BACKGROUND OF THE INVENTION

Data backup is a standard part of all large-scale computer data storage systems (and most small systems, as well). Data written to a primary storage medium, such as a local disk, are copied to a backup medium, such as another disk or a tape, which can then be used for recovery in case a disaster causes the data on the primary medium to be lost. Periodic backup of this sort is adequate for many storage systems. In mission-critical systems, however, it is frequently necessary that stored data be backed up immediately, as soon as the data are written to the primary medium. Therefore, large storage systems for critical storage applications typically provide a variety of copy services that can be called for immediate data backup while the application is running.

For example, the IBM Enterprise Storage Server (ESS), sold by IBM Corporation of Armonk, N.Y., supports several hardware-assisted copy functions to provide data mirroring for disaster recovery. These functions are described by Kulzer et al., in a publication entitled *IBM Enterprise Storage Server* (IBM International Technical Support Organization, San Jose, Calif., 1999), which is incorporated herein by reference. A number of different copy service functions of the ESS are described in Chapter 6 of this publication. These functions include:

Concurrent copy, which creates an instant (time zero) copy of a source volume or data set, while allowing the source to be modified in the meanwhile. The copy process is logically complete when a System Data Mover (SDM) component of the host operating system has figured out what data to copy. When an update to the source is to be performed before the data have been physically copied to the target, the original source data are first copied to a "sidefile" in cache memory. Up to 64 copying sessions can be active at one time.

Peer-to-peer remote copy (PPRC), in which a synchronous mirror copy of a source volume on a primary storage subsystem is created on a secondary storage subsystem. The primary and secondary storage subsystems typically belong to separate ESS systems, at mutually-remote locations. PPRC is implemented using a direct connection between the primary and secondary subsystems. When an application on a host processor writes to a PPRC volume on the primary subsystem, the corresponding data updates are entered into cache memory and non-volatile storage at the primary subsystem. The primary subsystem then sends the updates over the link to the secondary subsystem. When the secondary subsystem has placed the data in its own cache and non-volatile storage, it acknowledges receipt of the data, and the primary subsystem then signals the application that the write operation is complete.

Extended remote copy (XRC), like PPRC, creates a mirror copy on a secondary storage subsystem of a source volume on a primary storage subsystem. XRC, however, is an asynchronous process carried out by the SDM component of the host operating system. Applications on the host that write data to a source XRC volume receive notification from the primary subsystem that the write is complete as soon as the data have been secured in cache and non-volatile storage on the primary subsystem. In a separate operation, the SDM reads out the updates of the data from the cache and sends them to the secondary subsystem for mirror storage.

In a typical large-scale storage system, serving many different host applications, there are likely to be multiple instances of all of these different backup operations going on at one time. These operations can consume large amounts of system resources, such as processing capacity and cache memory. There is therefore a need for tools that can be used to manage the various backup operations in an efficient manner that conserves cache memory.

SUMMARY OF THE INVENTION

In preferred embodiments of the present invention, a single sidefile is used to capture data modifications and preserve images of data to be copied by different types of copy services within a single storage system. Although the use of a sidefile for a given host-driven copy service is known in the art, this approach consumes excessive cache memory when multiple sidefiles must be maintained for multiple, different services. The use of a combined sidefile conserves cache resources. Furthermore, the extension of the sidefile to peer-driven copy services, such as PPRC, enhances the performance of such services by reducing their response time and increasing the efficiency with which they can use available link bandwidth for data transfer.

There is therefore provided, in accordance with a preferred embodiment of the present invention, a method for data backup, including:

creating a sidefile in a cache memory of a data storage system;

adding a sequence of entries to the sidefile specifying copy operations to be respectively performed by copy services in the system, including at least first and second copy services of different, first and second types; and executing the copy operations specified by the operations using the first and second copy services.

In a preferred embodiment, the first copy service includes a concurrent copy service, and the second copy service includes an extended remote copy service or a peer-to-peer remote copy service.

In another preferred embodiment, the first copy service includes a host-driven copy service, and the second copy service includes a peer-driven copy service. Preferably, the first copy service includes an extended remote copy service, and the second copy service includes a peer-to-peer remote copy service.

Typically, adding the sequence of entries includes detecting changes made in the data in a volume of the storage system that is associated with one of the copy services, and adding the entries so as to cause the one of the copy services to back up the changes in the data.

Preferably, adding the sequence of entries includes linking together the entries corresponding to the different copy services in respective linked lists, wherein executing the copy operations includes performing the operations in a first-in-first-out order of the entries in the linked lists for the different services.

Additionally or alternatively, adding the entries includes allocating segments in the cache memory, and writing a plurality of the entries in the sequence to each of the segments, so that the linked lists of the entries can extend over two or more of the segments. Preferably, allocating the segments includes allocating a multiplicity of the segments in succession, and linking the segments one to another in the succession. Further preferably, executing the copy operations includes flagging the entries when the copy operations specified thereby have been executed, and deallocating the segments after all of the plurality of the entries therein have been flagged.

There is also provided, in accordance with a preferred embodiment of the present invention, data storage apparatus, including:

one or more storage volumes, arranged to store the data;

a cache memory, arranged to contain a sidefile; and a storage controller, which is coupled to add a sequence of entries to the sidefile specifying copy operations to be respectively performed by copy services that are applied to the data in the storage volumes, including at least first and second copy services of different, first and second types, and to execute the copy operations specified by the operations using the first and second copy services.

There is additionally provided, in accordance with a preferred embodiment of the present invention, a computer software product, including a computer-readable medium in which program instructions are stored, which instructions, when read by a computer, cause the computer to create a sidefile in a cache memory of a data storage system, to add a sequence of entries to the sidefile specifying copy operations to be respectively performed by copy services in the system, including at least first and second copy services of different, first and second types, and to execute the copy operations specified by the operations using the first and second copy services.

There is further provided, in accordance with a preferred embodiment of the present invention, a method for data backup, including:

creating a sidefile in a cache memory of a data storage system;

adding a sequence of entries to the sidefile specifying copy operations to be performed by a peer-to-peer remote copy service in the system; and executing the copy operations specified by the operations using the peer-to-peer remote copy service.

Preferably, adding the sequence of entries includes linking together the entries corresponding to different instances of the copy service in respective linked lists, wherein executing the copy operations includes performing the operations in a first-in-first-out order of the entries in the linked lists for the different instances.

There is moreover provided, in accordance with a preferred embodiment of the present invention, data storage apparatus, including:

one or more storage volumes, arranged to store the data;

a cache memory, arranged to contain a sidefile; and a storage controller, which is coupled to add a sequence of entries to the sidefile specifying copy operations to be respectively performed by a peer-to-peer remote copy service that is applied to the data stored in the storage volumes, and to execute the copy operations specified by the operations using the peer-to-peer remote copy service.

There is furthermore provided, in accordance with a preferred embodiment of the present invention, a computer software product, including a computer-readable medium in which program instructions are stored, which instructions, when read by a computer, cause the computer to create a sidefile in a cache memory of a data storage system, to add a sequence of entries to the sidefile specifying copy operations to be performed by a peer-to-peer remote copy service in the system, and to execute the copy operations specified by the operations using the peer-to-peer remote copy service.

The present invention will be more fully understood from the following detailed description of the preferred embodiments thereof, taken together with the drawings in which:

DETAILED DESCRIPTION OF PREFERRED EMBODIMENTS

Figure 1:
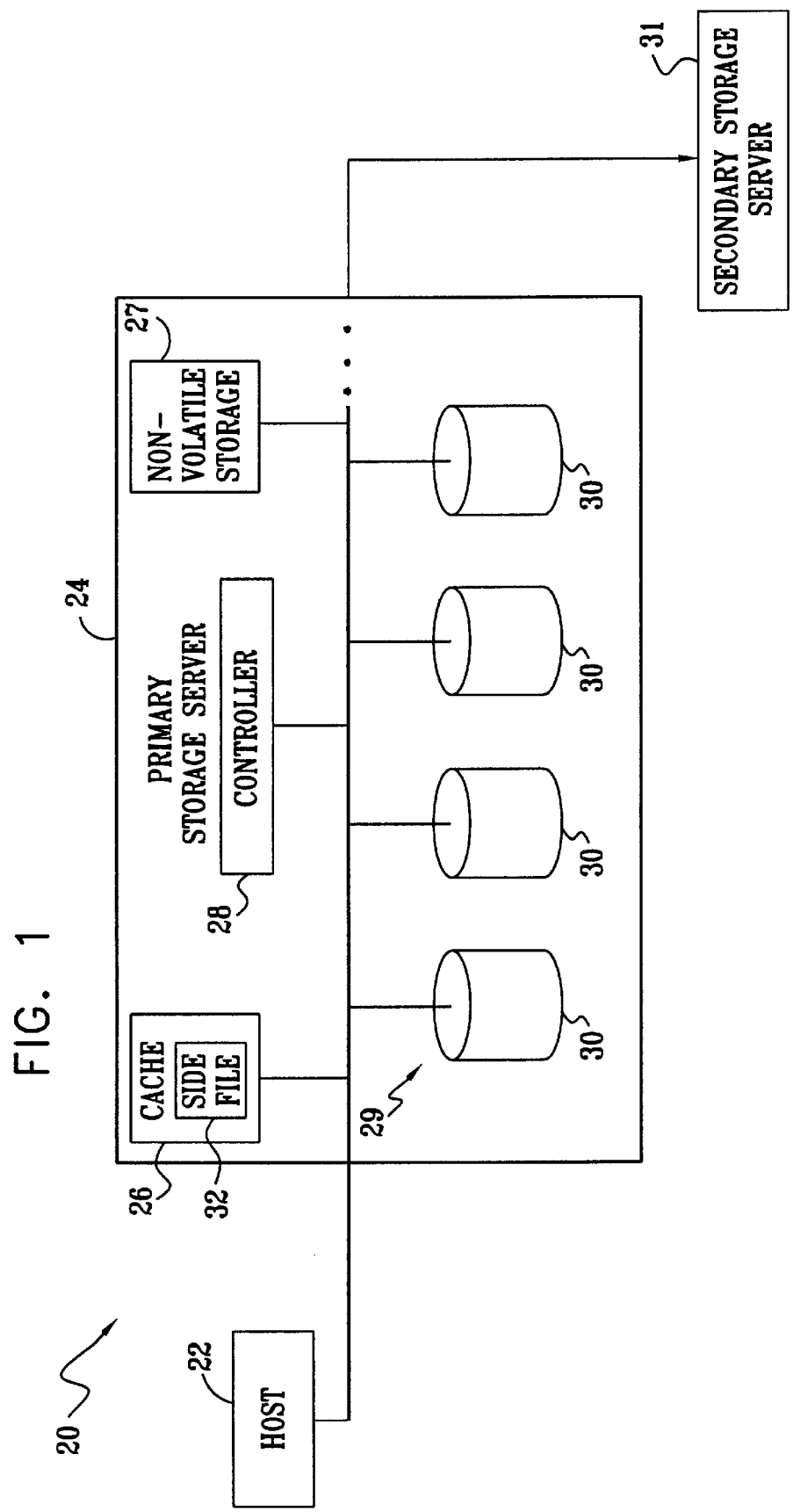
FIG. 1 is a block diagram that schematically illustrates a data processing and storage system, in accordance with a preferred embodiment of the present invention.

FIG. 1 is a block diagram that schematically illustrates a data processing and storage system 20, in accordance with a preferred embodiment of the present invention. System 20 comprises one or more host processors 22, coupled to a storage server 24, such as the ESS described in the Background of the Invention. Server 24 comprises a controller 28, typically made up of a cluster of microprocessors, having a cache memory 26 and non-volatile storage 27. The controller is coupled to one or more logical subsystems (LSS) 29, each of which comprises an array of storage volumes 30, typically made up of magnetic disks.

When an application running on host 22 writes data to one of storage volumes 30 that is designated for data backup, a copy services software component on server 24 is invoked, in a manner that is transparent to the application. Preferably, server 24 provides a range of such services, including both host-driven services, such as concurrent copy and XRC, and peer-driven services, such as PPRC. Some of these services, such as XRC and PPRC, cause data to be copied to a remote, secondary storage server 31. When data are written to one of volumes 30 or to a data set on one of the volumes for which a copy service has been invoked, an entry is created in a sidefile 32 in cache 26, identifying the data to be copied. The sidefile entries are queued in multiple linked lists, as described below with reference to FIG. 2. Controller 28 reads and executes the entries in the sidefile queues, and then erases the entries after it has carried out the required backup operations.

The data storage and backup operations described herein are carried out by host 22 and server 24 under the control of suitable software. The software may be provided in electronic form, over a network, for example, or it may alternatively be furnished on tangible media, such as CD-ROM, for installation on the appropriate processors.

Figure 2:
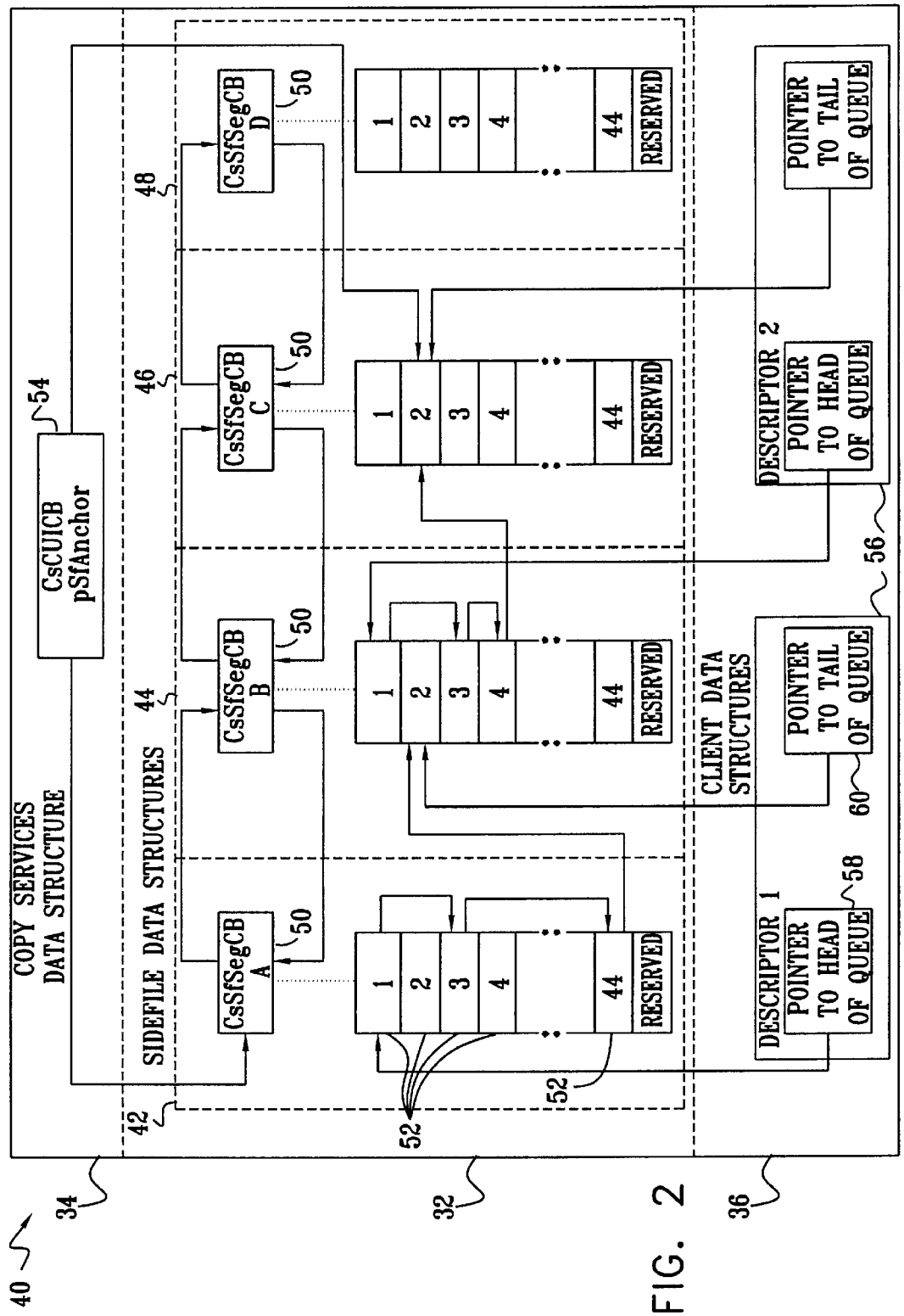
FIG. 2 is a block diagram that schematically illustrates data structures used for copy services, in accordance with a preferred embodiment of the present invention.

FIG. 2 is a block diagram that schematically illustrates a sidefile infrastructure 40, held in cache 26, in accordance with a preferred embodiment of the present invention. This infrastructure serves both the host-driven and peer-driven copy services simultaneously, using sidefile 32, which is common to all of the services. In addition to the sidefile itself, infrastructure 40 includes both a copy services data structure 34 and client data structures 36. The functions and interaction of these components are described in detail hereinbelow.

Sidefile 32 is a temporary repository used by the copy services component on server 24 to capture modifications or preserve a previous track image of customer data that participates in a copy services function. The sidefile comprises entries 52, which form several queues, as indicated by arrows in FIG. 2 connecting one entry to another. Each entry belongs to only a single queue. Every entry 52 holds information related to the write operation that gave rise to the entry and points to the corresponding data track image that must now be copied. The entries are read out of each of the queues in sidefile 32 in first-in-first-out (FIFO) order. When the data associated with an entry are finally read and copied to their destination by the appropriate copy services function, the entry is erased from the sidefile.

As copying functions create new entries, these entries are added serially in successive segments 42, 44, 46 and 48 of cache 26, which are allocated to the sidefile. (Although by way of illustration, four segments are shown in FIG. 2, a greater or smaller number of segments may be allocated and used in like fashion.) When host 22 writes to a track image (i.e., to the copy of a storage track in the cache) that is subject to backup by one of the copy services, a new entry is added and linked to the queue for that service in the current segment. As a result, the entries in the various queues are interleaved within the segments of the sidefile. A sidefile manager component of the software on server 24 is responsible for managing the sidefile segments, particularly for allocating and deallocating the memory used by the segments, and provides services for adding and removing sidefile entries from the queues. The sidefile manager also has general responsibilities, such as creating and discarding the sidefile, validating the sidefile during a warm start of server 24, and removing devices from the queues.

Sidefile 32 is designed so that all the queues associated with a given LSS 29 (also referred to as a "control unit image," or CUI) reside in one sidefile. This makes for efficient use of cache 26 and of the other resources of server 24. PPRC in particular generates many short queues, creating and discarding queues often. It is wasteful of cache space and of processing power to allocate or deallocate a cache segment every time a queue is created or discarded. Furthermore, since cache memory is ordinarily allocated in granularity of 4 KB, combining short queues into a single sidefile saves memory.

In exemplary sidefile 32 shown in FIG. 2, each segment 42, 44, 46, 48 preferably occupies 4 KB in cache 26 and contains forty-four entries 52, each entry 92 bytes in length (leaving an additional 48 bytes reserved in each segment). The sidefile manager accesses each segment via a respective control block 50, labeled CsSFSegCB. In addition to the linking of entries 52 one to another in queues, as described above, each control block 50 points to the control blocks of the preceding and succeeding segments, giving sidefile 32 a doubly-linked list structure. The sidefile manager need not be aware of the linking of the queues of entries 52. It does keep track, however, of the entries that have been erased in each segment (such as entries A.2 and A.4 in segment 42) and counts down the number of unerased entries in order to know when the segment can be deallocated.

The sidefile shown in FIG. 2 contains two queues: Entries A.1, A.3, A.44 (in segment 42) and B.2 (in segment 44) make up the queue of a first client, which could be a XRC service, for example. Entries B.1, B.3, B.4 (in segment 44) and C.2 (in segment 46) make up the queue of a second client, possibly a PPRC or concurrent copy service. Although for the sake of simplicity, only two queues are shown in FIG. 2, an actual sidefile typically serves many clients, each corresponding to an instance of a particular copy service performed on a respective track in subsystem 29. Each client maintains a respective descriptor 56 of its own queue, within client data structures 36. Each descriptor 56 includes a head pointer 58 to the head of the respective queue and a tail pointer 60 to the tail of the queue. In the present example, entry A.1 is the head entry of the first queue, and B.2 is the tail entry. Entry B.1 is the head entry of the second queue, and C.2 is the tail entry of the queue, as well as being the tail entry of sidefile 32. Copy services data structure 34 includes a pointer 54, labeled pSfAnchor, to this last entry in the sidefile. This pointer is incremented as each new entry 52 is added to one of the queues. Structure 34 also includes pointers to first segment 42 and last segment 48 in the sidefile, used to manage allocation of the segments.

Each entry 52 comprises a prolog common to all copy functions and a user area that is overlaid by each different copy function. The prolog preferably includes a track ID, identifying the track being copied, and a pointer to the cache directory control block (CDCB) of the track image. (The CDCB, containing 128 bytes for each track, is used for directory searching and identifying the least-recently-used item in the cache.) The prolog includes a pointer to the next entry in the FIFO queue (or a special code, such as FFFF if this is the last entry). It preferably includes additional pointers to the next entry and the previous entry in the Same Track list, which identifies all the entries that point to the same track image, even when the entries are in different queues. For each entry, the prolog also identifies the sectors of the track to be copied when the entry is transferred. In addition, the prolog includes flags that enable the sidefile manager and other components to determine the current status of the entry.

Figure 3:
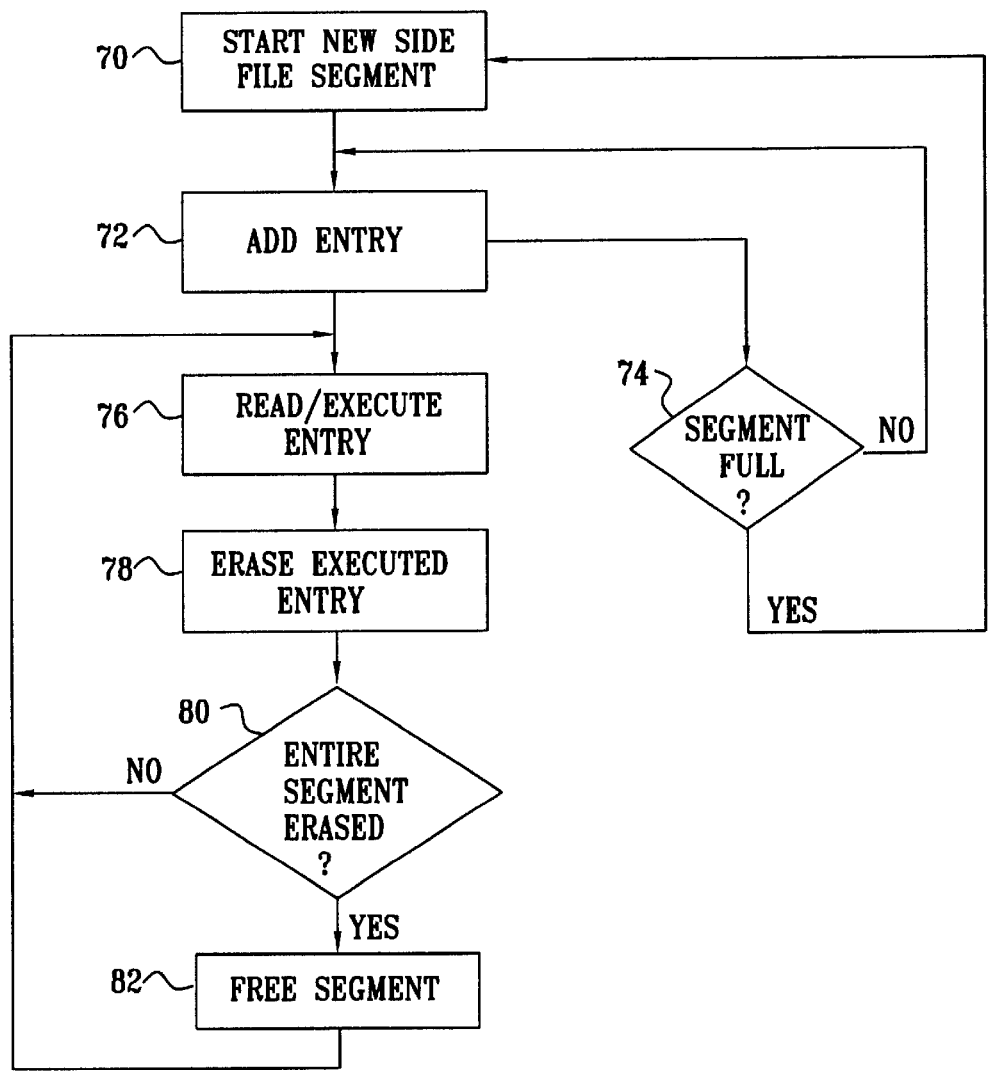
FIG. 3 is a flow chart that schematically illustrates a method for creating and using entries in a sidefile, in accordance with a preferred embodiment of the present invention.

FIG. 3 is a flow chart that schematically illustrates a method for creating and using entries in sidefile 32, in accordance with a preferred embodiment of the present invention. The sidefile is created by the sidefile manager at initial loading of microcode on server 24. The sidefile manager then allocates one or more free segments for new entries 52 in cache 26, at a new segment step 70. Typically, for the sake of efficiency, multiple segments are allocated at one time, most preferably fourteen segments at once, but for the sake of simplicity, the description here refers to single segments. For each segment, the sidefile manager requests and receives an allocation of a 4 KB page in cache 26. It then creates control block 50 for the segment, linking the block to the preceding and succeeding segments, as shown in FIG. 2. The sidefile manager also sets the pSfAnchor pointer to point to the first entry in the first new segment.

Entries are added to sidefile 32 by copy services on server 24 at an entry addition step 72, at the initiation of a client. The addition of entries to the sidefile is preferably handled by a callback function, which receives as its input parameters a pointer to the tail of one of the FIFO queues in the sidefile (or a null pointer if this is the first entry in a new queue), along with the track ID and type of the client creating the entry. The newly-created entry is appended to the last entry in the sidefile (indicated by the pSfAnchor pointer) and becomes the new sidefile tail entry. This new entry is also linked to the tail of the specified queue and becomes the new tail entry in the queue. The callback function also increments the counter of unerased entries in the segment in block 50.

When the entry addition function is invoked, it first checks to determine whether the current segment of the sidefile is full, at a segment checking step 74. The segment is determined to be full if pointer 54 points to the last entry (i.e., entry number 44) in the segment. If so, the new entry is created at the head of the next segment, which is selected based on the linking between control blocks 50. If there is no free segment available, the sidefile manager is called in order to allocate further free segments at step 70, as described above.

Client copy services read out and execute entries 52 from sidefile 32, at an execution step 76. This step is asynchronous with the segment allocation and entry addition steps described above. Getting the entries from the sidefile is also preferably carried out by a callback function, which receives as its inputs a pointer to the desired entry, i.e., to the next entry in the appropriate queue, along with flags indicating the desired disposition of the entry. Normally, the callback function returns the entry to the requesting service. If the service has raised a locking flag, the callback function locks the track associated with the entry while enabling the service to access the track, until the service has completed copying of the corresponding data in subsystem 29. Preferably, functions are also provided that enable clients to remove single entries, sequences of entries, or entire queues from sidefile 32 when it is no longer desired to execute these entries.

After the copy service has completed execution of an entry or deleted an entry, the resources associated with the entry are released, and the entry is erased from sidefile 32, at an entry erasure step 78. To carry out this step, the entry is unlinked from its Same Track list, and the bits indicating the blocks to be copied in the bitmap of the corresponding track image are reset, as appropriate. A flag is set in the prolog of the entry to indicate that the entry has been deleted. The counter of unerased entries in control block 50 of the segment is decremented.

The sidefile manager checks, at a segment erasure step 80, whether all of the entries in the segment have been flagged for deletion or, equivalently, whether the counter of unerased entries has been decremented down to zero. If so, the entire segment is freed for reuse, at a segment release step 82. This step also takes place asynchronously with the preceding steps of the method. If the segment in question is the last segment allocated to sidefile 32 (such as segment 48 in FIG. 2), pointer 54 can be set back to point to the first entry in the segment, so that the segment is immediately reused in the sidefile. Otherwise, the sidefile manager deallocates the segment, so that it is available for general cache use.

Figure 4:
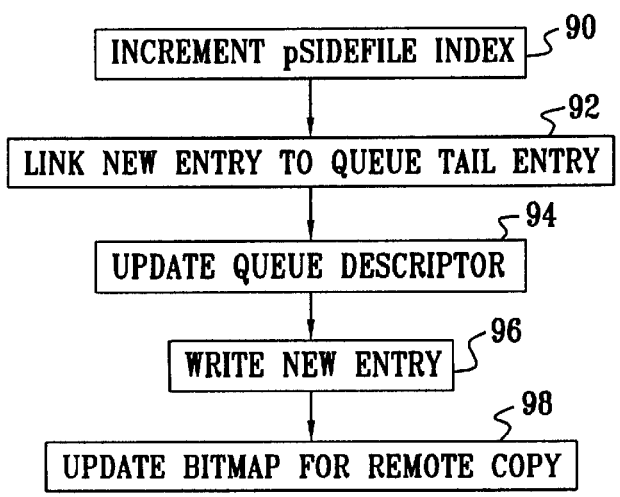
FIG. 4 is a flow chart that schematically illustrates a method for adding entries to a sidefile, in accordance with a preferred embodiment of the present invention.

FIG. 4 is a flow chart that schematically shows details of entry addition step 72, in accordance with a preferred embodiment of the present invention. After acquiring the necessary locks on sidefile 32 and on data structures 34 and 36, the entry addition callback function increments the index of pointer 54 to point to the next entry in the current segment (or to the first entry in a new segment, if appropriate), at an index incrementing step 90. This new entry is linked to the tail entry in its queue, at a linking step 92. Next, descriptor 56 for this queue is updated, at a descriptor update step 94, by setting pointer 60 to point to the new entry, identifying it as the current tail of the queue. If pointer 58 is null (i.e., if this is the first entry in a new queue), pointer 58 is also set to point to the new entry as the head of the queue.

The data structures of the new entry itself are filled in, at a new entry writing step 96, based on the parameters of the copy operation associated with the entry. These data structures, including data fields and flags, were described above with reference to FIG. 2. For remote copy operations, such as XRC and PPRC, bits are set in a track bitmap to indicate the segments of the source volume that are to be copied, at a bitmap update step 98. At this point, all of the locks are released, and the new entry waits for execution by step 76.

Figure 5:
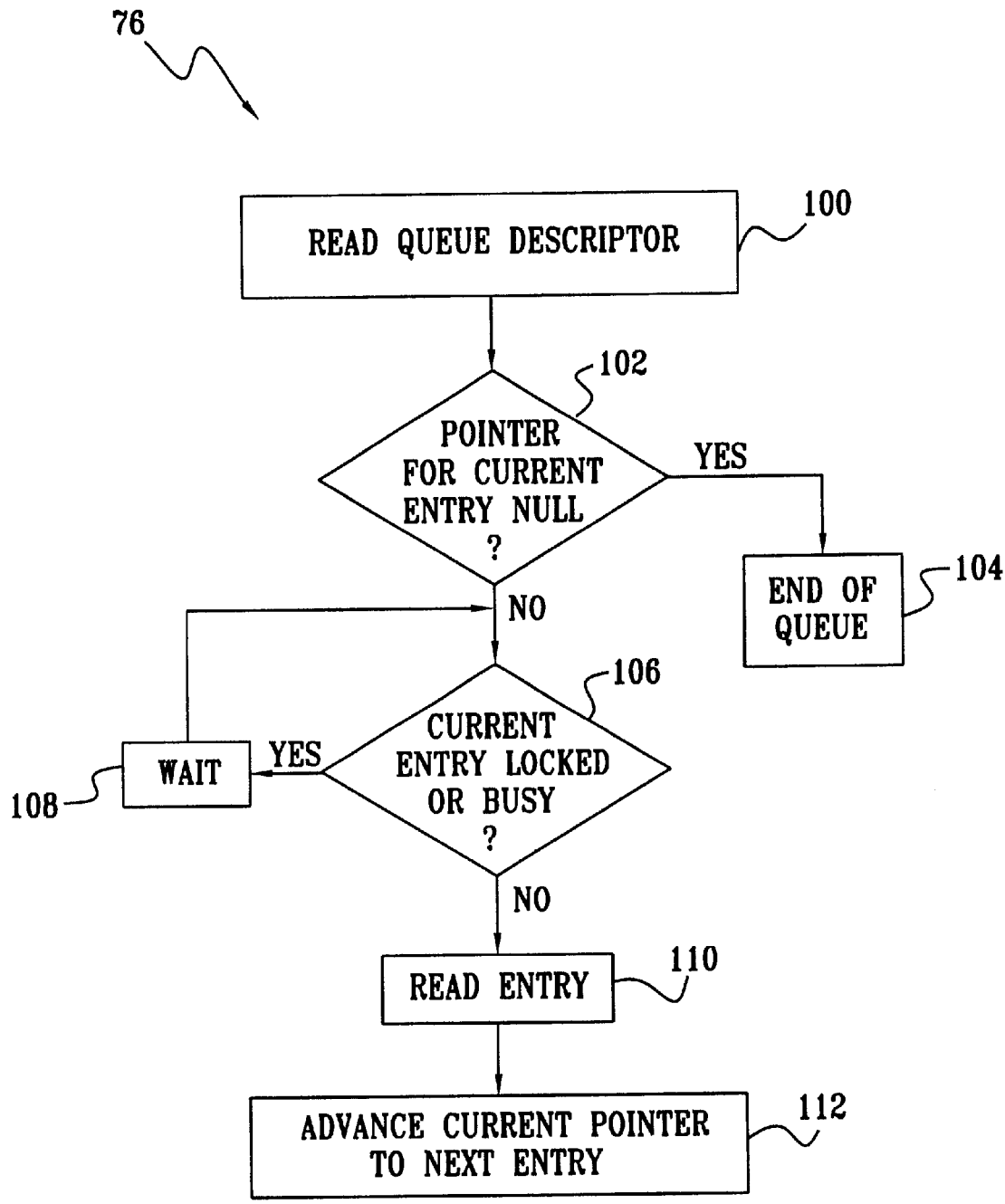
FIG. 5 is a flow chart that schematically illustrates a method for reading entries in a sidefile, in accordance with a preferred embodiment of the present invention.

FIG. 5 is a flow chart that schematically shows details of execution step 76, in accordance with a preferred embodiment of the present invention. This step uses the callback function described above for getting the next entry to be executed by a given client service from sidefile 32. The same procedure is used to get the entries from the sidefile regardless of the type of copy function involved—concurrent copy, XRC or PPRC.

In order to get the next entry, the callback function acquires the necessary locks and reads queue descriptor 56 for the client service requesting the entry, at a descriptor reading step 100. The callback function examines a pointer held in descriptor 56, which points to the next entry in the queue awaiting execution, at a pointer examination step 102. (This pointer is not shown in FIG. 2.) If the pointer is null, it means that the previous entry was the last one in this queue, and the queue is now finished. In this case, the callback function returns an end-of-queue status indication, at a queue end step 104. The service will, in this case, go on to process its next queue, if there is one.

When the pointer at step 102 indicates an actual next entry in the queue, the callback function attempts to acquire the necessary locks in order to read the entry, at a current entry examination step 106. If the entry is already locked, or if the track to which the entry pertains is busy, the callback function informs the copy service that it must wait until the entry or track is free, at a wait step 108. In this case, the service will instruct the callback function to retry step 106 after a certain period of time has elapsed.

If the callback function is successful in accessing the entry, it reads out and passes the entry to the requesting client service, at an entry reading step 110. The service carries out the required data copying or other operation, as appropriate. The pointer to the current entry in descriptor 56 is advanced to the next entry in the queue, at a pointer advance step 112, and the callback function is now prepared to service the next read request.

Although preferred embodiments are described hereinabove with reference to certain specific data copying functions, the principles of the present invention are similarly applicable to other types of data copy and backup functions, as are known in the art. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for data backup, comprising:

creating a sidefile in a cache memory of a data storage system;

adding a sequence of entries to the sidefile specifying copy operations to be respectively performed by copy services in the system, including at least first and second copy services of different, first and second types; and executing the copy operations specified by the operations using the first and second copy services, wherein adding the sequence of entries comprises linking together the entries corresponding to the different copy services in respective linked lists, and wherein adding the entries comprises allocating segments in the cache memory, and writing a plurality of the entries in the sequence to each of the segments, so that the linked lists of the entries can extend over two or more of the segments.

2. A method according to claim 1, wherein allocating the segments comprises allocating a multiplicity of the segments in succession, and linking the segments one to another in the succession.

3. A method according to claim 1, wherein executing the copy operations comprises flagging the entries when the copy operations specified thereby have been executed, and deallocating the segments after all of the plurality of the entries therein have been flagged.

4. Data storage apparatus, comprising:

one or more storage volumes, arranged to store the data;

a cache memory, arranged to contain a sidefile; and a storage controller, which is coupled to add a sequence of entries to the sidefile specifying copy operations to be respectively performed by copy services that are applied to the data in the storage volumes, including at least first and second copy services of different, first and second types, and to execute the copy operations specified by the operations using the first and second copy services, wherein the controller is arranged to link together the entries corresponding to the different copy services in respective linked lists, and wherein the controller is arranged to allocate segments in the cache memory, and to write a plurality of the entries in the sequence to each of the segments, so that the linked lists of the entries can extend over two or more of the segments.

5. Apparatus according to claim 4, wherein the controller is arranged to allocate a multiplicity of the segments in succession, and to link the segments one to another in the succession.

6. Apparatus according to claim 4, wherein the controller is arranged to flag the entries when the copy operations specified thereby have been executed, and to deallocate the segments after all of the plurality of the entries therein have been flagged.

7. A computer software product, comprising a computer-readable medium in which program instructions are stored, which instructions, when read by a computer, cause the computer to create a sidefile in a cache memory of a data storage system, to add a sequence of entries to the sidefile specifying copy operations to be respectively performed by copy services in the system, including at least first and second copy services of different, first and second types, and to execute the copy operations specified by the operations using the first and second copy services, wherein the instructions cause the computer to link together the entries corresponding to the different copy services in respective linked lists, and wherein the instructions cause the computer to allocate segments in the cache memory, and to write a plurality of the entries in the sequence to each of the segments, so that the linked lists of the entries can extend over two or more of the segments.

8. A product according to claim 7, wherein the instructions cause the computer to allocate a multiplicity of the segments in succession, and to link the segments one to another in the succession.

9. A product according to claim 7, wherein the instructions cause the computer to flag the entries when the copy operations specified thereby have been executed, and to deallocate the segments after all of the plurality of the entries therein have been flagged.

10. A method for data backup, comprising:

creating a sidefile in a cache memory of a data storage system;

adding a sequence of entries to the sidefile specifying copy operations to be performed by a peer-to-peer remote copy service in the system; and executing the copy operations specified by the operations using the peer-to-peer remote copy service, wherein adding the sequence of entries comprises linking together the entries corresponding to different instances of the copy service in respective linked lists, and wherein adding the entries comprises allocating segments in the cache memory, and writing a plurality of the entries in the sequence to each of the segments, so that the linked lists of the entries can extend over two or more of the segments.

11. A method according to claim 10, wherein allocating the segments comprises allocating a multiplicity of the segments in succession, and linking the segments one to another in the succession.

12. A method according to claim 10, wherein executing the copy operations comprises flagging the entries when the copy operations specified thereby have been executed, and deallocating the segments after all of the plurality of the entries therein have been flagged.

13. Data storage apparatus, comprising:

one or more storage volumes, arranged to store the data;

a cache memory, arranged to contain a sidefile; and a storage controller, which is coupled to add a sequence of entries to the sidefile specifying copy operations to be respectively performed by a peer-to-peer remote copy service that is applied to the data stored in the storage volumes, and to execute the copy operations specified by the operations using the peer-to-peer remote copy service wherein the controller is arranged to link together the entries corresponding to different instances of the copy service in respective linked lists, and wherein the controller is arranged to allocate segments in the cache memory, and to write a plurality of the entries in the sequence to each of the segments, so that the linked lists of the entries can extend over two or more of the segments.

14. Apparatus according to claim 13, wherein the controller is arranged to allocate a multiplicity of the segments in succession, and to link the segments one to another in the succession.

15. Apparatus according to claim 13, wherein the controller is arranged to flag the entries when the copy operations specified thereby have been executed, and to deallocate the segments after all of the plurality of the entries therein have been flagged.

16. A computer software product, comprising a computer-readable medium in which program instructions are stored, which instructions, when read by a computer, cause the computer to create a sidefile in a cache memory of a data storage system, to add a sequence of entries to the sidefile specifying copy operations to be performed by a peer-to-peer remote copy service in the system, and to execute the copy operations specified by the operations using the peer-to-peer remote copy service, wherein the instructions cause the computer to link together the entries corresponding to different instances of the copy service in respective linked lists, and wherein the instructions cause the computer to allocate segments in the cache memory, and to write a plurality of the entries in the sequence to each of the segments, so that the linked lists of the entries can extend over two or more of the segments.

17. A product according to claim 16, wherein the instructions cause the computer to allocate a multiplicity of the segments in succession, and to link the segments one to another in the succession.

18. A product according to claim 16, wherein the instructions cause the computer to flag the entries when the copy operations specified thereby have been executed, and to deallocate the segments after all of the plurality of the entries therein have been flagged.

* * * * *